US012646426B2

(12) United States Patent
Hatchett

(10) Patent No.: US 12,646,426 B2
(45) Date of Patent: Jun. 2, 2026

(54) ELECTRONIC ROTATING RIDER APPARATUS AND SYSTEM

(71) Applicant: Jeffrey Keith Hatchett, Collierville, TN (US)

(72) Inventor: Jeffrey Keith Hatchett, Collierville, TN (US)

( * ) Notice: Subject to any disclaimer, the term of this patent is extended or adjusted under 35 U.S.C. 154(b) by 39 days.

(21) Appl. No.: 18/802,106

(22) Filed: Aug. 13, 2024

(65) Prior Publication Data

US 2025/0336314 A1 Oct. 30, 2025

Related U.S. Application Data

(60) Provisional application No. 63/638,642, filed on Apr. 25, 2024.

(51) Int. Cl.

| | |
|---|---|
| ***G09F 11/26*** | (2006.01) |
| ***G09F 9/30*** | (2006.01) |
| ***G09F 13/02*** | (2006.01) |
| *G09F 7/18* | (2006.01) |

(52) U.S. Cl.
CPC ................ *G09F 9/30* (2013.01); *G09F 13/02* (2013.01); *G09F 2007/1804* (2013.01); *G09F 11/26* (2013.01)

(58) Field of Classification Search
CPC ..... B65G 2207/04; G09F 11/12; G09F 11/15; G09F 11/26; G09F 7/18; G09F 7/22
See application file for complete search history.

(56) References Cited

U.S. PATENT DOCUMENTS 842,582 A * 1/1907 Powers .................. G09F 11/26 40/472
2,376,932 A * 5/1945 Gleerup et al. ......... G09F 11/26 40/472
2,844,894 A * 7/1958 Marshall ................ G09F 13/00 428/3
4,685,233 A 8/1987 Hull
4,825,575 A * 5/1989 Rethke ................ G09F 15/0062 248/533
5,255,463 A 10/1993 Werner
6,216,371 B1 4/2001 Kim
(Continued)

FOREIGN PATENT DOCUMENTS

DE 3807385 A * 2/1989

*Primary Examiner* — Cassandra Davis
(74) *Attorney, Agent, or Firm* — Dunlap Bennett & Ludwig PLLC

(57) ABSTRACT

An electronic signpost with customizable elements is provided. The arm portion can include a plurality of components installed therein such as a controller, a communications circuit, a battery, a motor and a customized spool with a plurality of indicia. The arm portion can be slidably covered by a casing having a solar array, a viewing window, and a plurality of fasteners thereon. The post portion can include a plurality of components installed therein such as a controller, a battery, a motor, a stabilizer, and a customized spool with a plurality of indicia. The post portion can be slidably covered by a casing having a solar array, and a viewing window. In operation, a user can select, from a client device, one or more customizations which can be transmitted to the signpost via a network. Actuation of elements of the signpost can cause the one or more customizations to be performed.

4 Claims, 4 Drawing Sheets

(56) References Cited

U.S. PATENT DOCUMENTS

| | | | |
|---|---|---|---|
| 6,345,458 | B1 | 2/2002 | Garibian |
| 8,028,448 | B2 | 10/2011 | Amrani |
| 8,122,629 | B2 | 2/2012 | Cowgill |
| 9,262,948 | B2 | 2/2016 | Pounders |
| 9,542,871 | B1 | 1/2017 | White et al. |
| 9,965,815 | B1 | 5/2018 | Campbell et al. |
| 11,244,583 | B1 * | 2/2022 | Harris .................. G09F 15/0018 |
| 2006/0185203 | A1 | 8/2006 | Bittle et al. |
| 2006/0260160 | A1 | 11/2006 | Herman |
| 2007/0193088 | A1 | 8/2007 | Lemberger et al. |
| 2007/0261280 | A1 | 11/2007 | Rastegar |
| 2009/0012857 | A1 | 1/2009 | Schelfaut |
| 2020/0111392 | A1 | 4/2020 | Wagnermarsh |
| 2022/0000295 | A1 * | 1/2022 | Sankey ................... G09F 13/06 |

* cited by examiner

ELECTRONIC ROTATING RIDER APPARATUS AND SYSTEM

CROSS-REFERENCE TO RELATED APPLICATION

This application claims the benefit of priority of U.S. provisional application No. 63/638,642, filed Apr. 25, 2024, the contents of which are herein incorporated by reference.

BACKGROUND OF THE INVENTION

The present invention relates to signage, and more particularly, to an electronic rider system integrated into a folding post.

Online mechanisms for advertising real estate include lists, social media, digital marketing, etc., but these methods are costly and disconnected from traditional methods of face-to-face communication. Real estate rider plaques offer a customizable mechanism to sit atop traditional "for sale" signs that can organically generate interest more than their fixed cost investment. However, traditional "for sale" signposts, in an L or H configuration, can typically only accept one rider plaque at a time. Furthermore, illumination of rider plaques typically occurs via Light Emitting Diodes and/or crystal display screens that can cause night blindness. Replacement of a rider plaque is inefficient as it costs time and money associated with travel to and from the location of the rider plaque, which can add up if there is a need to switch several riders, or to physically switch the same rider several times.

As can be seen, there is a need for an integrated folding post and rider system, with natural backlighting, that can deliver a plurality of riders by remote control without the need to visit the location each time a change is needed.

SUMMARY OF THE INVENTION

In one aspect of the present disclosure, a customizable foldable electronic signpost includes an arm configured to house a first plurality of components including a first controller, a communications circuit, a first motor, at least one first power source, and a first all-weather rider spool mechanism. The first all-weather rider spool mechanism includes a customized rider spool with a first plurality of indicia disposed thereon which can be customizably selected by a user. A first housing is slidably mounted to the arm and is configured to protect the first plurality of components. The first housing can include a solar array disposed on a first surface, and one or more illuminative elements disposed on other surfaces of the first casing. Additionally, a plurality of fasteners can be disposed on a surface of the first casing and can be configured to support a sign attached thereto. The customizable foldable electronic signpost includes a post configured to house a second plurality of components including a second controller, a second motor, at least one second power source, a stabilizer configured to maintain the customizable signpost in an upright configuration, and a second all-weather rider spool mechanism. The second all-weather rider spool mechanism includes a customized rider spool with a second plurality of indicia disposed thereon which can be customizably selected by the user. A second housing is slidably mounted to the post and is configured to protect the second plurality of components. The second housing can include a plurality of illuminative elements disposed on a first surface of the second casing. The arm and post of the electronic signpost can be hingably affixed to one another, such that the electronic signpost can be folded/unfolded into a stowed/operational position based on the user's needs.

In another aspect of the present disclosure, a system for controlling the electronic signpost is provided. The system includes the electronic signpost of the present invention, and receives at the first controller via the communication circuit at least one selection related to at least one of the first plurality of indicia, the second plurality of indicia, the first plurality of illuminative elements, and the second plurality of illuminative elements of the electronic signpost. Based on the received selection one of the first motor, the second motor, the first illuminative elements, or the second illuminative elements can be actuated. A status of the electronic signpost can be transmitted based on actuation of the received selection.

In another aspect of the present disclosure, a system for controlling the electronic signpost is provided. The system includes at least one processor, and at least one memory storing instructions that when executed cause the at least one processor to perform a method. The method of the system includes selecting, via a first user interface element, at least one customizable element of the customizable signpost to form a customization request. The at least one customization request can include at least one of: at least one selectable indicia, and a state of an illuminative element. Once selected, the customization request can be transmitted to the electronic signpost. At least one status related to the customization can be received from the electronic signpost and displayed to a user via a second user interface.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Real estate advertising utilizing signposts and riders is costly and inefficient due in large part to the amount of space needed to transport signposts, the amount and customization of riders needed for advertising, and the costs associated with switching and replacing riders in a timely manner.

Broadly, an embodiment of the present invention provides a foldable signpost with at least one customized rider spool that can be changed remotely. The present invention can consist of a foldable sign post configured to display a hanging sign, and to house a plurality of components for at least one customizable rider spool. Additionally, the present invention can include a computing environment configured to allow remote operation of the customizable rider spool.

Broadly, an embodiment of a foldable signpost with at least one customized rider spool allows a user to advertise or market real estate or business listings while changing the rider status remotely. Furthermore, the post can fold to a stowed position which can be a smaller footprint than prior art signposts.

Figure 1:
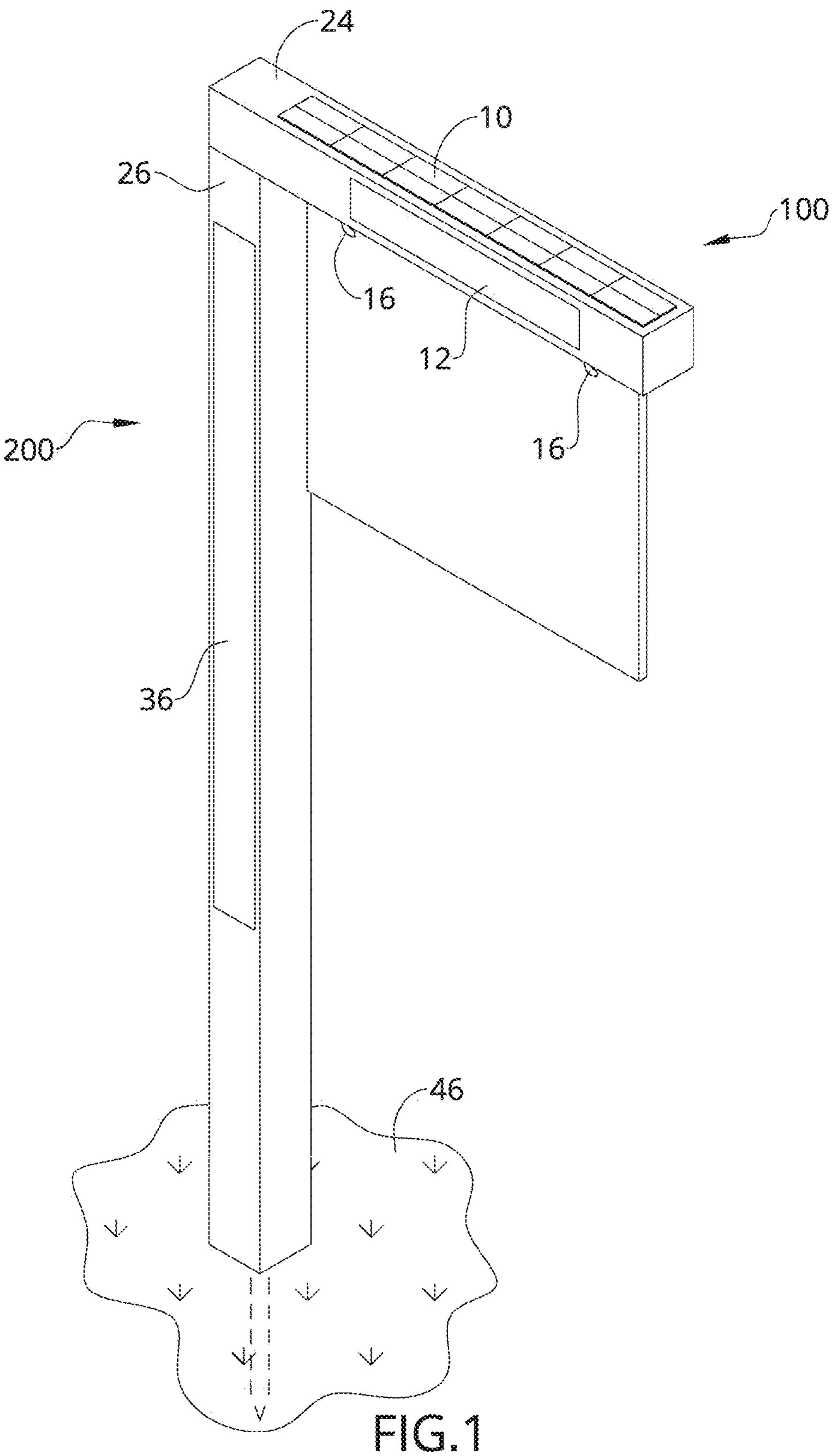
FIG. 1 is a perspective view of an embodiment of a folding post with electric rider, according to aspects of the present invention.

Referring now to FIGS. 1-5, a foldable signpost with at least one customized rider spool is illustrated. FIG. 1 illustrates the signpost which can include a post body 200 with a casing 26 to protect the internal elements of post body 200. Post body 200 can include at least one cutout portion 36 configured to display one of a plurality of riders selected by a user from the at least one customized rider spool disposed therein. In embodiments, post body 200 can include at least two cutout portions 36 disposed on opposing surfaces of post body 200. Post body 200 can be anchored into the ground 46 for stability utilizing post stake 44. Post body 200 can be foldably affixed to post arm 100 which can include an arm casing 24 to protect the internal elements of post arm 100.

Post arm 100 can include at least one cutout portion 12 configured to display one of a plurality of riders selected by a user from at least one customized rider spool disposed therein. In embodiments, post arm 100 can include at least two cutout portions 12 disposed on opposing surfaces of post arm 100. Post arm 100 can include a plurality of fasteners 16 configured to accept a sign (unlabeled) for display. Finally, post arm 100 can include a solar array 10 configured to charge an internal battery (not shown), and/or to supply power to electrical components including scrollable riders, lights, motor, and/other electromechanical devices disclosed herein.

Figure 2:
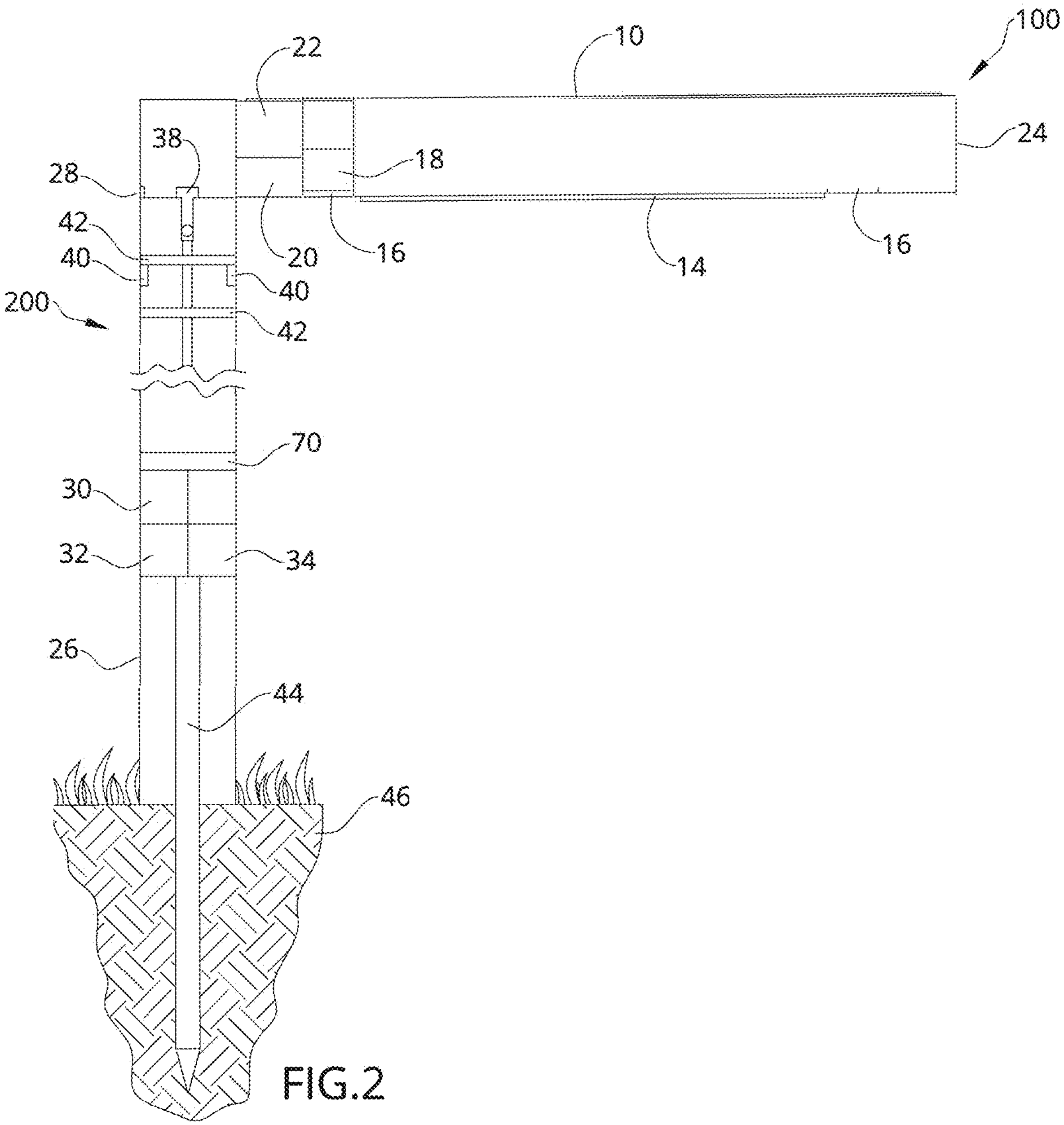
FIG. 2 is a schematic view of an embodiment of a folding post with electric rider, according to aspects of the present invention.

FIG. 2 illustrates internal components of the foldable signpost with electronically actuatable rider(s). Post arm 100 can be surrounded, or otherwise encased, by a protective casing 24 configured to provide protection to the internal elements of post arm 100. In embodiments, protective casing 24 can be slidably attached to post arm 100 for ease of access to internal components, and can be made of durable weatherproof material such as vinyl, polyvinyl chloride (PVC), etc. Casing 24, or post arm 100, can have mounting clips 16 disposed thereon, which can be utilized to affix a sign, or other advertisement. Casing 24 can have weep holes 28 disposed thereon, which can be adapted to allow accumulated moisture to exit the interior of post arm 100.

Casing 24 can have a solar array 10 disposed along a first surface, which can be configured to charge batteries 20 and 32, or to otherwise provided electrical power to electromechanical elements of the system, such as but not limited to, motors 18 and 30, illuminative elements 14, circuits and communications systems 22 and 34. Casing 24 can have illuminative elements 14 disposed along a second surface, either interior or exterior, which can be configured to illuminate the system during times of low-light, such as dawn, dusk, and night. In embodiments, illuminative elements 14 can be light emitting diodes (LEDs), or other similar lower power lighting elements. At least one customized rider spool, described hereinafter, can be actuated by components driven by a first motor 18 housed on the interior of post arm 100. Control and communication circuits 22 can be configured to control actuation of motor 18 based on user selectable settings and to communicate wirelessly with additional elements of the system, described further herein. In embodiments, communication can be performed via any known wireless methodology, such as but not limited to, cellular communication, wireless, WIFI, Bluetooth®, near field communication, etc.

Post arm 100 can be coupled to post body 200 via a hinge system 38, described hereinafter, which can be configured to pivot, bend, or otherwise flex, such that post arm 100 can move from an extended position perpendicular to post body 200, to a stowed position parallel to post body 200. Advantageously, folding in this manner can create a smaller form factor for easier storage of multiple signpost systems.

As illustrated in FIG. 2, post body 200 can be surrounded, or otherwise encased, by a protective casing 26 configured to provide protection to the internal components of post body 200. In embodiments, protective casing 26 can be slidably attached to post body 200 for ease of access to internal components, and can be made of durable weatherproof material such as vinyl, polyvinyl chloride (PVC), etc. Hinge system 38 can be mounted in the interior of post body 200 via mounting plates 42. In embodiments, the mounting plates 42 can have threaded holes to secure to threads disposed on hinge system 38. Post body 200, and or casing 26, can have bump stops 40 installed thereon to absorb shock associated with folding post arm into the stowed position, wherein post body 100 is substantially parallel to post body 200. At least one customized rider spool, described hereinafter, can be actuated by components driven by a second motor 30 housed on the interior of post body 200 and secured by mounting plate 70. Post control circuits 34 can be configured to actuate second motor 30 based on user selectable settings. In embodiments, post control circuits 34 can receive commands from circuits and communication 22 in a controller-target relationship. Casing 26 can have illuminative elements 14 disposed along a second surface, either interior or exterior, which can be configured to illuminate the system during times of low-light, such as dawn, dusk, and night. In embodiments, illuminative elements 14 can be light emitting diodes (LEDs), or other similar lower power lighting elements.

Post battery 32 can provide power to electromechanical components of post body 200 such as, but not limited to, second motor 30 and post control circuits 34. Post stake 44 can be installed on the interior of post body 200 and can be configured to secure the electronic rider system to ground 46. In embodiments, post stake 44 can be tubular in shape having a circular base at a first end, and a cone, or conical shape at a second end. In embodiments, post stake 44 can be of sufficient length, such that, when installed into ground 46, it can provide support for the foldable signpost.

Figure 3:
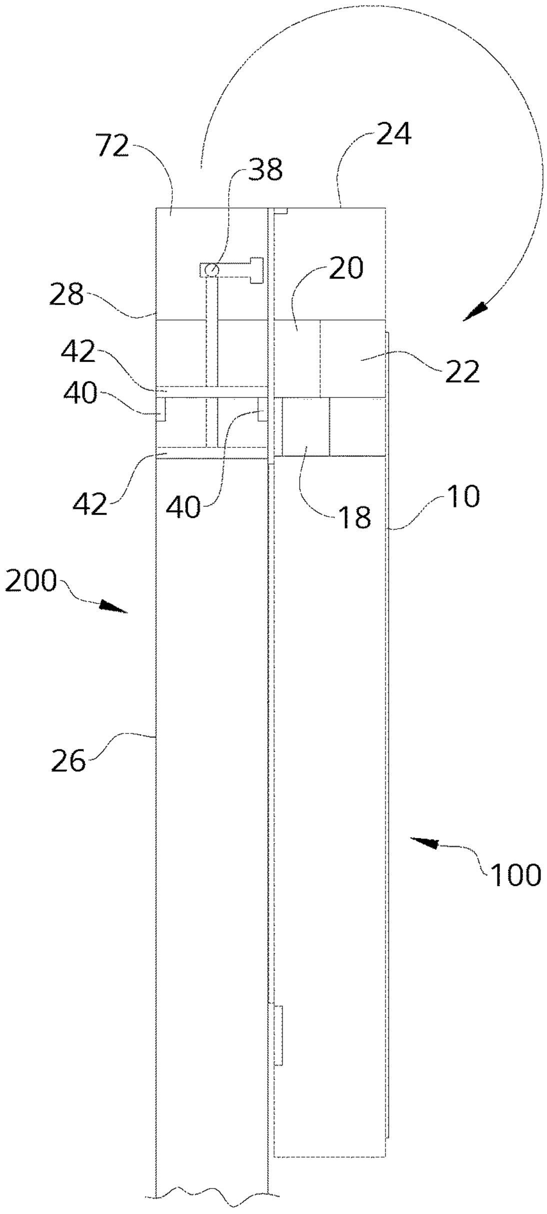
FIG. 3 is a schematic view of an embodiment of a folding post with electric rider showing motion of a folding portion, according to aspects of the present invention.

FIG. 3 illustrates actuation of the hinge system 38 to move electronic rider system from an extended position, as shown in FIG. 1-2, to a stowed position, as shown in FIG. 3. In embodiments, hinge system 38 can include a threaded I-bolt secured to mounting plates 42 in post body 200. Post arm 100 can be mounted to a platform secured to the I-bolt of the hinge system 38 via a fastener, such as a nut and bolt configuration, passing through an eye of the I-bolt and the platform. Support pin (not shown) can be utilized to secure the system in the extended position. Post sleeve 72 can slide up/down the post body 200 to allow a seamless look whether the system is in an extended or stowed position. When actuated post arm 100 can move from a substantially perpendicular orientation, with respect to post body 200, when extended, to a substantially parallel configuration, with respect to post body 200, when stowed.

Figure 4:
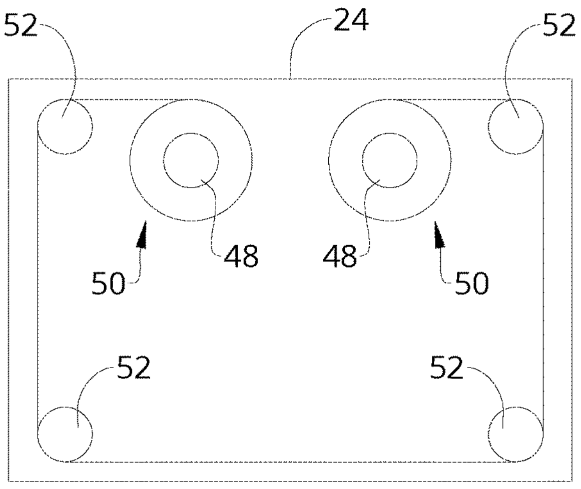
FIG. 4 is an cross-sectional view of an embodiment of a customizable rider spool, according to aspects of the present invention.

FIG. 4 illustrates a cross-sectional view of a customizable rider spool according to aspects of the present invention. The scrolling system can be housed on the interior of post arm 100, and/or post body 200, and protected by arm casing 24, and/or protective casing 26. A customized spool 50 can be created to include a number of advertising riders, preloaded thereon. In embodiments, the customized spool can include words, phrases, emojis, images, indicia, etc., and can be disposed on spool rods 48. In embodiments, customized spool 50 can be made from weather-proof material, such as water-proof and/or ultraviolet-resistant materials known in the art. When actuated by first motor 18, or second motor 30 one, or both, of the spool rods 48 can rotate thereby transferring a portion of the customized spool 50 from a first spool rod 48 to a second spool rod 48, or vice versa. Rollers 52 can be utilized to maintain tension and proper tracking of customized spool 50 as it moves between spool rods. In embodiments, motors 18 and/or 30 can be controlled by control and communication circuits 22 to position one of the number of advertising riders, based on a selection by a user, in alignment with at least one cutout of portion 12 and/or 36, such that the one of the number of advertising riders is viewable. While aspects of the customized rider spool are described with respect to components of post arm 100, it is understood that the same configuration can be present in an electronic rider system of post body 200 utilizing components therein.

Figure 5:
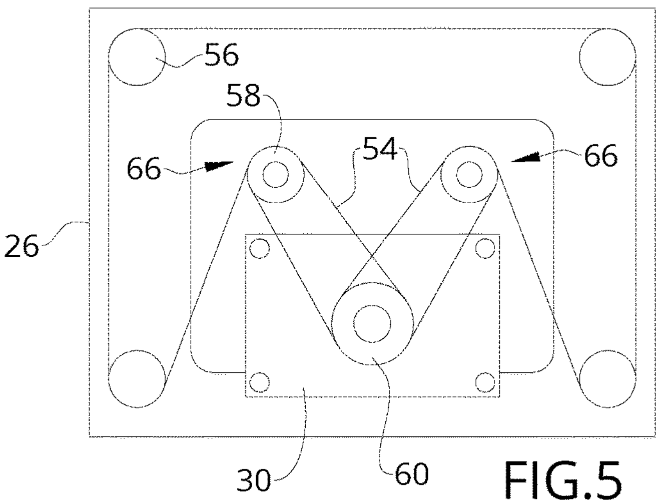
FIG. 5 is a cross-sectional view of an embodiment an actuation mechanism for the customizable rider spool, according to aspects of the present invention.

FIG. 5 illustrates a cross-sectional view of the electronic rider scrolling system connected to a customizable rider spool according to aspects of the present invention. The scrolling system can be housed on the interior of post arm 100 and/or post body 200 can protected by arm casing 24 and/or post casing 26. A customized spool 66 can be created to include a number of advertising riders, preloaded thereon. In embodiments, the customized spool can include words, phrases, emojis, images, indicia, etc., and can be disposed on spool rods 58. In embodiments, customized spool 50 can be made from weather-proof material, such as water-proof and/or ultraviolet-resistant materials known in the art. Motor 30 can actuate to turn timing wheel 60 which can subsequently actuate a plurality of timing wheels 58 and spool rods 56 by virtue of coupling with belts 54. Customized spool 66 can spool from a first timing wheel 58 to a second timing wheel 58 by actuation of the motor 30 and timing wheels 58 and 60. Spool rods 56 can maintain tension and provide proper tracking of the customized spool as the spool moves between timing wheels. In embodiments, motor 30 can be controlled by post control circuits 34 to position one of a number of advertising riders, selected by a user, in alignment with at least one cutout of arm 200 and casing 26, such that the one of the number of advertising riders is viewable. While aspects of the electronic rider system are described with respect to components of post body 200, it is understood that the same configuration can be present in an electronic rider system of post arm 100 utilizing components therein such as motor 18 and control and communication circuits 22.

Figure 6:
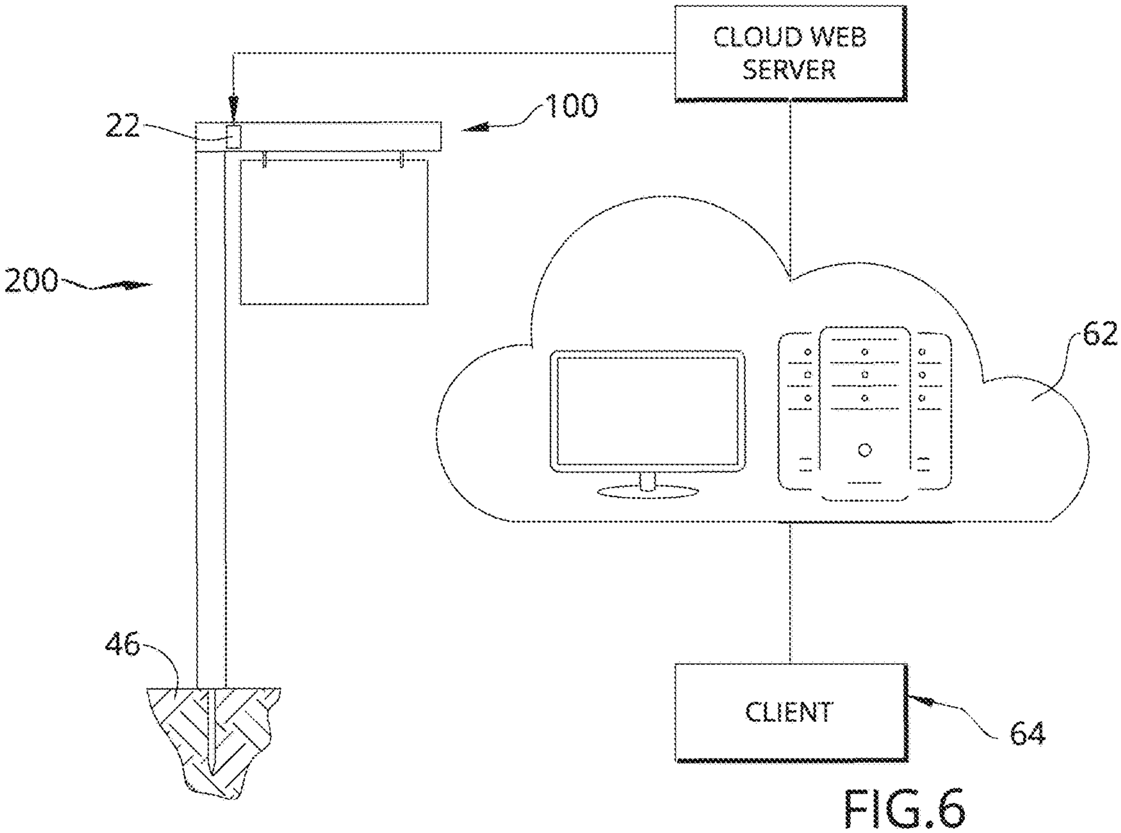
FIG. 6 is a block diagram of an embodiment of a system including a folding post with electric rider, according to aspects of the present invention.
Figure 7:
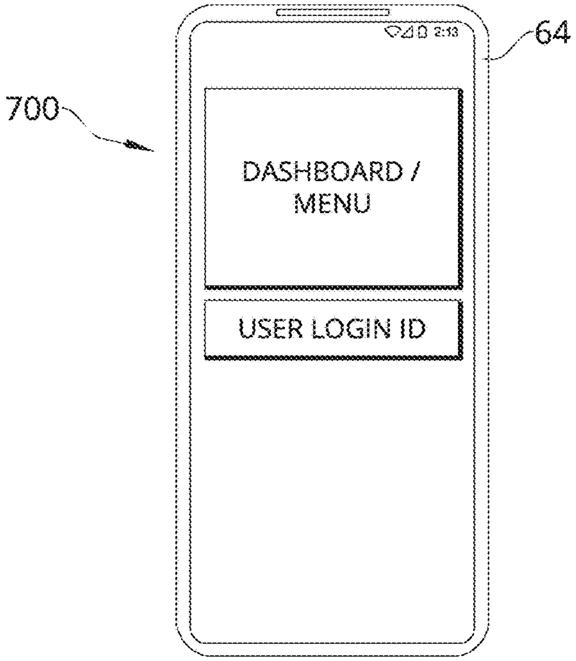
FIG. 7 is a graphical user interface of a dashboard of the system, according to aspects of the present invention.
Figure 8:
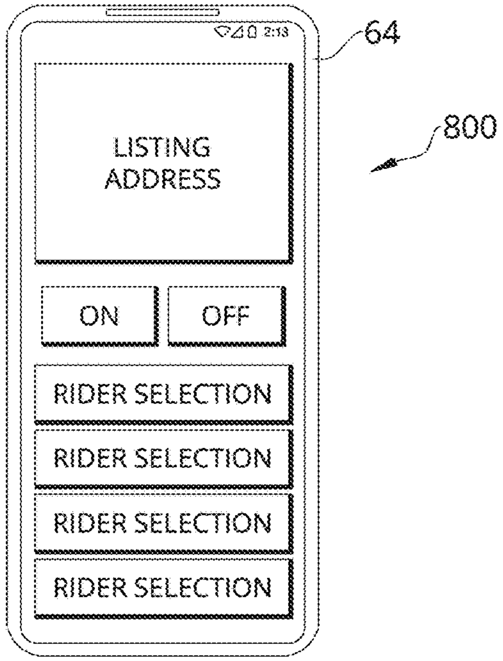
FIG. 8 is a graphical user interface of a listing interface, according to aspects of the present invention.

Referring now to FIGS. 6-8, computerized communication aspects of the system are illustrated. FIG. 6 illustrates the interaction between at least two of Control and communication circuits 22, post control circuits 34, and at least one client device 64. Control and communication circuits 22 can be the main controller of the system and can be responsible for relaying instructions to first motor 18 and second motor 30 to actuate their respective customized rider spools. Additionally, control and communication circuits 22 can relay control commands for second motor 30 to post control circuits 34 to control second motor 30. Control and communication circuits 22 can be communicatively coupled to at least one network 62 including at least one cloud web server. The at least one network 62 can be communicatively coupled to at least one client device 64, which can be a computing device such as, but not limited to, a computer, a laptop, mobile device, etc. Advantageously, network 62 can allow bi-directional communication between Control and communication circuits 22 and client device 64, to control all aspects of the electrical rider system.

In embodiments, Control and Communication circuits 22 and/or post control circuits 34 can be and/or include a processor, a microprocessor, a computer processing unit ("CPU"), a graphics processing unit ("GPU"), a neural processing unit, a physics processing unit, a digital signal processor, an image signal processor, a synergistic processing element, a field-programmable gate array ("FPGA"), a sound chip, a multi-core processor, and so forth. As used herein, "processor," "processing component," "processing device," and/or "processing unit" can be used generically to refer to any or all of the aforementioned specific devices, elements, and/or features of the processing device.

In embodiments the at least one network 62 can include hardware and/or software for generating and communicating signals over a direct and/or indirect network communication link. As used herein, a direct link can include a link between two devices where information is communicated from one device to the other without passing through an intermediary. For example, the direct link can include a Bluetooth™ connection, a Zigbee connection, a Wifi Direct™ connection, a near-field communications ("NFC") connection, an infrared connection, a wired universal serial bus ("USB") connection, an ethernet cable connection, a fiber-optic connection, a firewire connection, a microwire connection, and so forth. In another example, the direct link can include a cable on a bus network. An indirect link can include a link between two or more devices where data can pass through an intermediary, such as a router, before being received by an intended recipient of the data. For example, the indirect link can include a WiFi connection where data is passed through a WiFi router, a cellular network connection where data is passed through a cellular network router, a wired network connection where devices are interconnected through hubs and/or routers, and so forth. The cellular network connection can be implemented according to one or more cellular network standards, including the global system for mobile communications ("GSM") standard, a code division multiple access ("CDMA") standard such as the universal mobile telecommunications standard, an orthogonal frequency division multiple access ("OFDMA") standard such as the long-term evolution ("LTE") standard, and so forth.

FIG. 7 illustrates an exemplary computing device, as a client device 64, including a dashboard user interface 700. Dashboard user interface 700 can allow a user to login into the system and track each individual electronic post rider by a unique identifier such as a property address, or location. In embodiments, dashboard user interface 700 can provide a scrollable summary of the status of each electronic post rider, which can be selectable by the user for further control.

In embodiments, at least one actuatable user interface element is configured to provide functionality associated with dashboard user interface 700. For example, the at least one actuatable user interface element can include a user login element configured to allow a user to provide login credentials to access functionality of the system. Additionally, the at least one actuatable user interface element can include a Dashboard/Menu element configured to allow a user to access functionality of the system related to configuring, modifying, viewing, etc., elements of the system including scrollable riders and/or illuminative elements, as further illustrated in FIG. 8.

FIG. 8 illustrates an exemplary computing device, as client device 64, including an individually selected electronic post rider interface. When a user selects an individual post rider from dashboard 700, a second screen can present a display 800, which can include a status, and options associated with the specific electronic post rider. In embodiments, a status can include a unique identifier of the rider, the location of the rider, battery health, etc. In embodiments, display 800 can include a property address, or location, and buttons, or actuatable elements, to turn illuminative elements 14 on/off, select a specific rider from at least one of customized spool 50 and/or customized spool 66, set timing constraints for illuminative elements 14, etc. Once options are selected on display 800, the option can be communicated through network 62 to Control and Communication circuits 22, which can send instructions to perform the selected options to the appropriate elements, such as motors 18 and/or 30, and illuminative elements 14. Advantageously, the systems of FIGS. 6-8 allow a user to modify an electronic rider in real-time without having to incur the expense and time associated with driving to the location of the rider and physically changing rider information or setting up lighting.

For illustrative purposes an exemplary operation of the foldable signpost with customizable electronic rider(s) is provided. A user can install the foldable signpost by actuating hinge system 38 to place post arm 100 in a position substantially perpendicular to post body 200. Post body 200 can be secured to ground 46, by the user, by inserting post stake 44 into ground until post body 200 is in substantially flush contact with ground 46. Additionally, after installation the user can install a sign on post arm 100 by utilizing fasteners 16. Once installed, power can be provided to the foldable signpost by one or more of solar array 10, and/or batteries 20, 32.

A user can configure/customize the foldable signpost through an application resident on client device 64. The application resident on client device 64 can provide for a user login, and dashboard 700 which provides access to at least one foldable signpost associated with a unique identifier, such as a property address. Upon login, the user can associate the at least one foldable signpost a unique identifier, such as a property address, zip code, etc.

The user can access any of the at least one foldable signpost via Dashboard 700, which can provide a display 800 for configuration/customization of the at least one foldable signpost. Display 800 provides user with a unique identifier of the foldable signpost, such as a property address, and one or more actuatable user interface elements to configure/customize the at least one foldable signpost. For example, the user can choose to actuate one or more illuminative elements 14, such as turning on/off, or setting a dawn/dusk mode where the illuminative elements 14 turn on at dusk and turn off at dawn daily. Additionally, one or more user interface elements can be configured to provide rider selection from customized spools 50 and/or 66. For example, a user can access Display 800 to select one of a plurality riders present on at least one of customized spool 50 and/or 66 which can include words, phrases, emojis, images, indicia, etc. Additionally, at least one user interface element can be provided to scheduling rider selections, such that at least one of customized spool 50, and/or 66 can move to a selected rider during a present time.

It should be understood, of course, that the foregoing relates to exemplary embodiments of the invention and that modifications may be made without departing from the spirit and scope of the invention as set forth in the following claims.

What is claimed is:

1. A customizable signpost, comprising:

an arm housing a first plurality of components, wherein the first plurality of components include: a first controller, a communications circuit, a first motor, at least one first power source, and a first all-weather rider spool, wherein the first all-weather rider spool includes a first plurality of indicia disposed thereon;

a first housing slidably mounted to the arm and configured to protect the first plurality of components;

a post housing a second plurality of components, wherein the second plurality of components include: a second controller, a second motor, at least one second power source, a stabilizer configured to maintain the customizable signpost in an upright configuration, and a second all-weather rider spool, wherein the second all-weather rider spool includes a second plurality of indicia disposed thereon; a second housing slidably mounted to the post and configured to protect the second plurality of components; and a hinge device configured to couple the arm to the post.

2. The customizable signpost of claim 1, further comprising:

a solar array coupled to a first surface of the first housing configured to supply power the customizable signpost;

a first plurality of illuminative elements disposed on a second surface of a first casing; and a second plurality of illuminative elements disposed on a first surface of a second casing.

3. A system for controlling a customizable signpost, comprising:

the customizable signpost of claim 2;

the first controller is configured to:

receive via the communication circuit, at least one selection related to at least one of the first plurality of indicia, the second plurality of indicia, the first plurality of illuminative elements, and the second plurality of illuminative elements;

actuate based on the at least one selection, at least one of the first motor and the second motor;

transmit to a remote device, at least one status based on the actuating.

4. The customizable signpost of claim 1, further comprising: a plurality of fasteners disposed on a third surface of a first casing, wherein the plurality of fasteners are configured to support a sign mounted thereon.

* * * * *